United States Patent [19]
Lombard et al.

[11] 3,709,070
[45] Jan. 9, 1973

[54] GOVERNOR UNIT FOR AUTOMATIC TRANSMISSION

[75] Inventors: Claude Lombard; Jean Piret, both of Billancourt, France

[73] Assignees: Regie Nationale des Usines Renault, Hauts de Seine; Automobiles Peugeot, Paris, France

[22] Filed: Jan. 21, 1971

[21] Appl. No.: 108,386

[30] Foreign Application Priority Data

Jan. 26, 1970 France...................7002585

[52] U.S. Cl. .................................................74/866
[51] Int. Cl. .....................................B60k 21/00
[58] Field of Search..........................74/866

[56] References Cited

UNITED STATES PATENTS 3,495,469  2/1970  Lombard..............................74/866
2,932,211  4/1960  Vernhes................................74/866
3,324,740  6/1967  Lewis et al. ........................74/866
3,572,176  3/1971  Bildat..................................74/866

Primary Examiner—C. J. Husar
Attorney—Stevens, Davis, Miller & Mosher

[57] ABSTRACT

This governor designed for controlling automatic change-speed transmissions of automotive vehicles is characterized by the disposal of all electrical and electronic devices and elements in a common casing comprising at least two hollow bodies forming a plurality of fluid-tight chambers, one body being insulated and disposed on the transmission side and the other conducting and disposed on the opposite side of said transmission, the resulting grouping of the various functions providing obvious technical and economical advantages.

11 Claims, 4 Drawing Figures

GOVERNOR UNIT FOR AUTOMATIC TRANSMISSION

The present invention relates in general to improvement in or relating to electronic control means usually referred to as "governors" for delivering the control orders necessary for changing the ratio of automatic change-speed transmission mechanisms in motor vehicles.

Devices of this character are already known, notably those described and illustrated in the U.S. Pat. No. 3,344,294 of Sept. 26, 1967, No. 3,443,135 of May 6, 1969 and No. 3,495,469 of Feb. 17, 1970.

These devices are based on the one hand on a main data transmitter or governor responsive notably to the vehicle speed and the engine load, and on the other hand on an electronic receiver or comparator adapted to analyze the input data and to transform them into electrical orders or signals transmitted to the change-speed mechanism in order to determine inter alia continuous or stepped gear changes.

This form of actuation, wherein the governor and the comparator constitute mechanically separate units, makes it necessary to increase the number of connections between the apparatus and also to ensure a very accurate adjustment and setting thereof, independently of each other, so that they remain fully interchangeable. Finally, this separation requires separate casings to be fastened separately to the gearbox or transmission.

According to the specific improvements brought by the present invention to these known devices, the assembling of the two functions into a common casing provides additional advantages which did not appear a priori:

a. The various points of the assembly are adjustable in a single operation consisting in fitting the generator by partial demagnetization of its magnet;

b. Elimination of low-level data outputs highly sensitive notably to humidity and more particularly to salt water;

c. The dimensions are considerably lower than the sum of the component elements due both to the improvement of volume filling and to a greater freedom in the choice of the data levels as mentioned in (b), as a consequence of the improved fluid tightness;

d. Substantial reduction in the commercial cost;

e. Facility of completing the engine load control determining the gear change point by means of an auxiliary control, contact, magnetic stop, potentiometer, etc. for controlling auxiliary functions without adding any complication to the exterior shape of the apparatus;

f. Easy maintenance, since the detection of a faulty component is substantially eliminated.

Other features and advantages of this invention will appear as the following description proceeds with reference to the attached drawings given by way of example; in the drawings.

Figure 1:
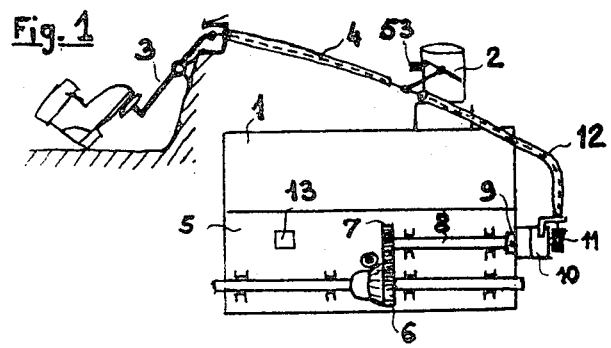
FIG. 1 is a diagrammatic general view of a change-speed transmission mechanism with an engine and a governor with an electronic comparator.

Referring first to FIG. 1, an engine 1 of a vehicle is equipped with a carburettor having a butterfly or throttle valve 2 controlled by an accelerator pedal 3 through a flexible connecting cable 4. A ring gear 6 of a differential associated with the change-gear transmission mechanism 5 drives through a toothed wheel 7, a shaft 8 and a screw-driver type coupling 9 provided at the outer end of this shaft and coupled with a governor-comparator assembly 10 comprising a load-factor control segment 11 connected through a flexible cable 12 to the carburettor throttle 2 shown in its inoperative position in which it engages a stop 53 incorporating an electrical contact. Electrical control members 13 are inserted in the hydraulic circuit of the change-speed transmission mechanism. The load factor of the engine may also be obtained, of course, from a vacuum diaphragm acting upon the governor-comparator assembly and connected to the induction manifold (not shown).

Figure 2:
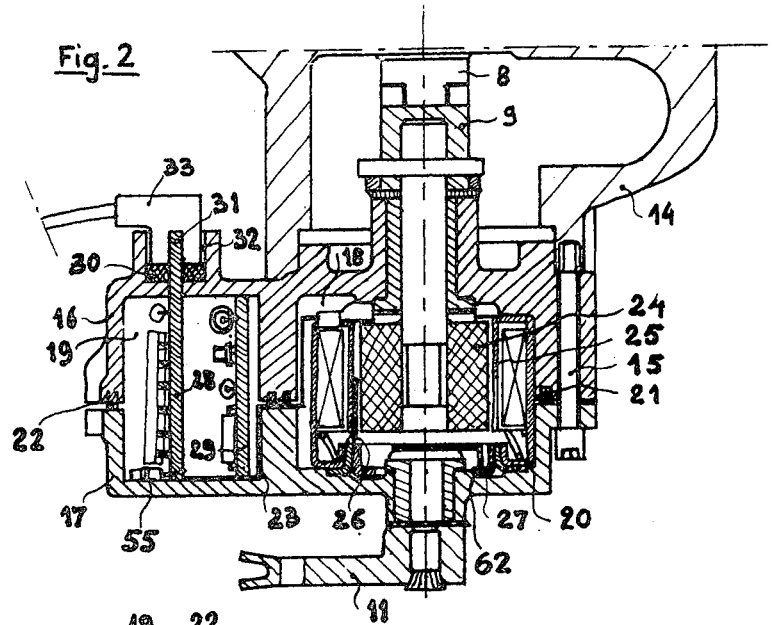
FIG. 2 is an axial section taken along the axes of the shafts driving the governor-comparator assembly.

FIG. 2 illustrates the casing 14 of the change-speed transmission mechanism 5. Secured to this casing 14 by means of bolts 15 are hollow bodies 16, 17 of which the body 16 is heat-insulating and consists for instance of fiber-filled injected polyamid material, contrasted to the other body 17 which is both heat-conducting and electrically conducting, and is also insulated from the casing 14; this body 17 may consist for example of die-cast aluminum or light alloy.

Thus, two main cavities 18 and 19 are formed, which enclose a tachometric generator 20 of known type and series of electronic circuits, respectively. The fluid-tightness of these cavities from the outside is obtained by means of cylindrical gaskets or O-rings 21, 22 fitted in grooves formed in the body 16.

The generator and electronic casing are electrically interconnected by a flexible flat wiring 23 passing under the gaskets 21, 22 without compromising their efficiency.

The tachometric generator 20 of known type is driven from shaft 8 and a screw-driver type coupling 9 so as to cause a multipolar magnet 24 to rotate past a stator 25. Some of the magnet poles 26 are movable angularly through a maximum angle corresponding to half a polar pitch under the control of a pin 27 connected to the control segment 11 actuated in conjunction with the gas throttle 2.

Disposed in the electronic cavity 19 are printed circuits 28, 29 carrying the corresponding electronic elements. The first circuit 28 emerges from the apparatus at 31 through a gasket 30 into an external well 32 of insulating body 16 in which a connector 33 is disposed. The power transistor elements 55 are secured to the conducting body 17 and properly connected thereto.

Figure 3:
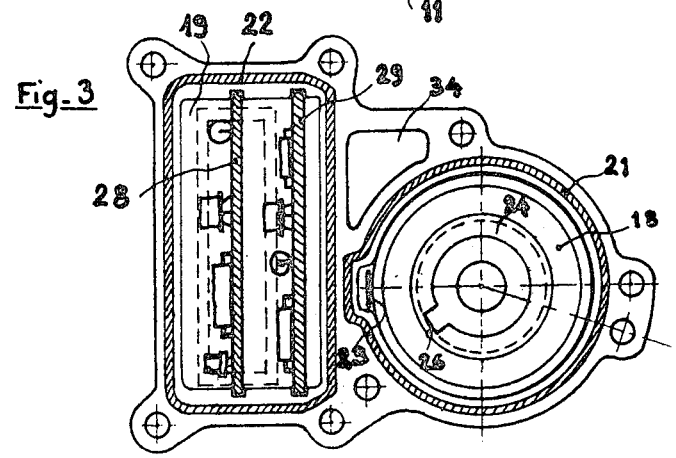
FIG. 3 is a cross-section of the apparatus of this invention.

FIG. 3 shows essentially the arrangement of the sealing gaskets 21, 22 and also the relative balance between the cavities 18 and 19. The reference numeral 34 designates an auxiliary cavity facilitating the casting of member 16.

Figure 4:
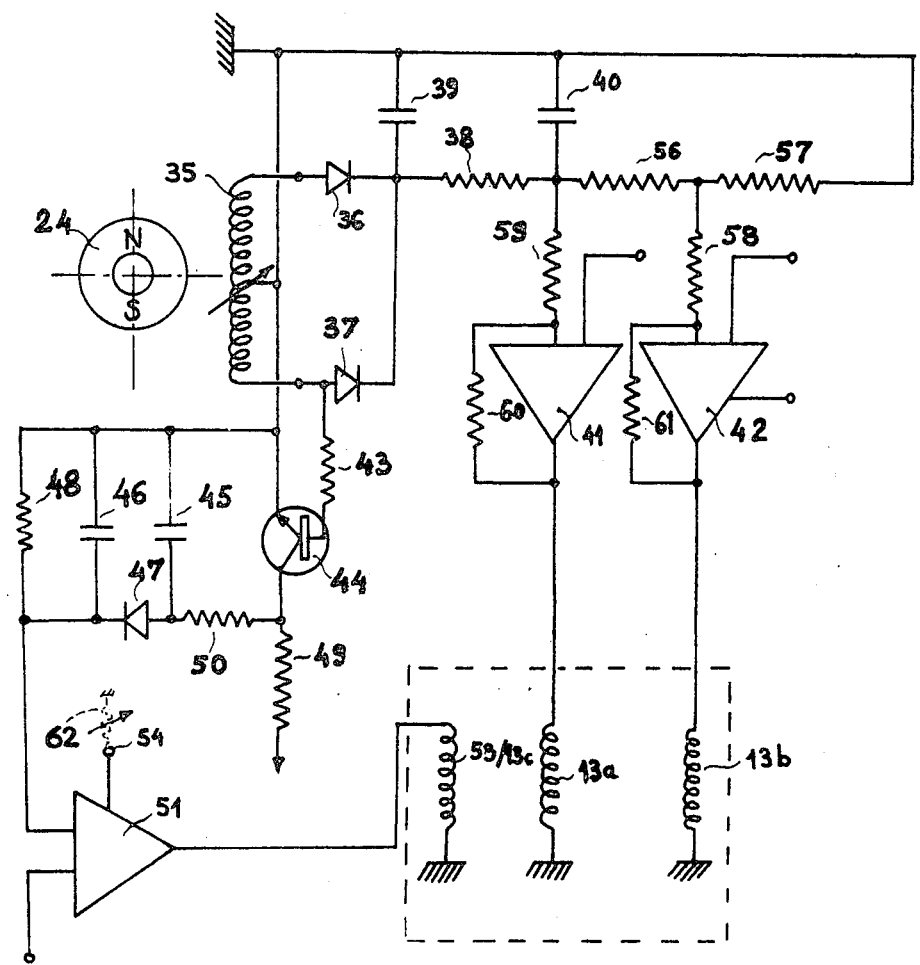
FIG. 4 is a general wiring diagram of a governor-comparator assembly with voltage control of two gear ratios and an auxiliary frequency control for example of a two-position abutment of a carburettor throttle.

FIG. 4 shows the magnet 24 of generator 20, a double coil 35 generating the induced voltage, a pair of diodes 36, 37 for rectifying the alternating current, a resistor 38 and capacitors 39, 40 for filtering this current before supplying same to amplifiers 41, 42 issuing orders to control members 13a, 13b which, though no part of the governor-comparator, are disposed likewise in the casing, as shown by the reference 13 in FIG. 1.

These control members may consist for example of solenoid-operated valves monitoring hydraulic slide valves or spool valves either continuously or by hit-or-miss operation.

The frequency of coil 35 is picked up by a resistor 43 and fed thereby to the base of a transistor 44 adapted to amplify and chop the generator signal and, through a known circuit comprising resistors 48, 49, 50, capacitors 45 and 46, and diode 47, to convert the frequency variations of coil 35 as a consequence of the variations in the vehicle speed into variations in the voltage across the terminals of resistor 48. These variations are fed to an amplifier 51 controlling in a manner known per se an executor member 53 consisting for example of a two-position abutment on the inoperative position of the carburettor throttle 2 (FIG. 1). The arrangement also comprises two idling positions according to the vehicle speed, a solution which may prove advantageous for solving anti-pollution problems. Similarly, the member 53 may be adapted to cut off the petrol supply at high engine speed. Thus, it is possible to obtain from a single tachometric device on the one hand control actions responsive to the engine load, by shifting the poles 26 and acting upon the control means 13a and 13b providing the necessary gear ratios, and on the other hand actions which, due to the frequency-responsive operation, are independent of the engine load and actuate the member 53.

At 13c this executor member may also be adapted to act as a control member upon the gear ratios, for examply by preventing the engagement, by means of the manual gear shift lever of an abnormally high ratio producing a braking action of the engine, when the vehicle is being driven at high speed. Finally, it is possible to associate the control means acting on poles 26 (FIG. 2) through stud 27 with an auxiliary device controlling a flat potentiometer 62 adhering to the casing 17 and responsive to a law of variation completely different from that governing said poles, and which would act upon the input 54 of amplifier 51 as shown in dotting line in FIG. 4.

The adjustment of the complete apparatus is extremely simple. In fact, upon completion of the assembling thereof, precision resistors 56, 57, 58, 59, 60 and 61 define within one gear ratio the points of operation. It is only necessary to bring the apparatus to the selected rotational velocity and to the selected position of poles 26, and to partly demagnetize the magnet 24 until one of the points has exactly the desired value. This demagnetization may be obtained in the known fashion by supplying alternating current to coil 35, and during the demagnetization the diodes 36 and 37 may be disconnected, if desired.

What is claimed as new is :

1. An electronic device for controlling continuous or stepped changes in a change-speed transmission of a vehicle, comprising: a transmission casing; a gear-box disposed in said transmission casing; electrical members for controlling the speed-change of said gear-box; electronic comparator means having semi-conductors for selectively energizing said electrical members; tachometric governor means operatively connected to transmit to said electronic comparator means information relative to the vehicle speed and to the vehicle engine accelerator position, said information being converted by said device into speed-change orders; and a common casing rigidly secured to said transmission casing containing said governor means and said electronic comparator means.

2. A device according to claim 1, wherein said tachometric governor means and electronic comparator means are disposed side by side and parallel to the driving shafts of said governor means.

3. A device according to claim 2, wherein the shaft driving the tachometric governor means is connected directly to the lay shaft of the output-speed transmission.

4. A device according to claim 1, wherein said common casing comprises two hollow bodies formed with a plurality of cavities, a first body secured to the transmission casing comprising a rigid insulating material and a second body remote from the transmission comprising an electrically conducting and heat conducting material, said electrical members being thermally connected to said conducting material.

5. A device according to claim 4, wherein said first body is formed of a fiber-filled polyamide resin and said second body is formed of die-cast aluminum.

6. A device according to claim 4, wherein each of said hollow bodies covers at least one-fourth and at the most one-half of the total inner volume of said common casing; and further comprising cylindrical gaskets for separately sealing the cavities containing said tachometric governor means and said electronic comparator means, respectively, and flexible conducting wire strips passing under said gaskets to provide an electrical connection between said tachometric governor means and said electronic comparator means.

7. A device according to claim 4, wherein said tachometric governor means comprises an alternator having poles shifted by movement of the accelerator pedal of said vehicle.

8. A device according to claim 1, wherein said electronic comparator means comprises first amplifier means responsive to the voltage delivered by said tachometric governor means and second amplifier means responsive through a frequency-voltage limiter-converter to the frequency of the signal generated by said tachometric governor means.

9. A device according to claim 7, further comprising means for partly demagnetizing said alternator at only one gear ratio change point to adjust the change speed transmission.

10. A device according to claim 8, wherein said amplifier means are responsive to the frequency controlling carburation, said amplifier means being connected to means for opening a carburettor throttle of said vehicle engine and to means for cutting-off the fuel supply to said engine.

11. A device according to claim 8, wherein said amplifiers are responsive to a frequency to control safety means for preventing the gear shift lever of said vehicle from being shifted to an abnormally high gear ratio at high vehicle speed.

* * * * *